United States Patent
Shahar et al.

(10) Patent No.: US 10,609,722 B2
(45) Date of Patent: Mar. 31, 2020

(54) TECHNIQUES FOR SCHEDULING COMMUNICATION BASED ON RECEIVE DATA CAPACITY

(71) Applicant: Intel IP Corporation, Santa Clara, CA (US)

(72) Inventors: Itzik Shahar, Kadima (IL); Hakan Magnus Eriksson, Portland, OR (US); Oren Shalita, Tel-Aviv (IL); Pratap Prasad, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/022,140

(22) Filed: Jun. 28, 2018

(65) Prior Publication Data

US 2020/0008217 A1    Jan. 2, 2020

(51) Int. Cl.
| | |
|---|---|
| H04B 7/212 | (2006.01) |
| H04W 72/12 | (2009.01) |
| H04W 28/02 | (2009.01) |
| H04L 29/06 | (2006.01) |
| H04W 88/06 | (2009.01) |
| H04W 76/10 | (2018.01) |
| H04J 3/00 | (2006.01) |

(52) U.S. Cl.
CPC ... *H04W 72/1252* (2013.01); *H04W 28/0278* (2013.01); *H04J 3/00* (2013.01); *H04L 65/4069* (2013.01); *H04W 76/10* (2018.02); *H04W 88/06* (2013.01)

(58) Field of Classification Search
USPC .... 370/229, 230, 230.1, 235, 236, 252, 314, 370/345, 412, 442, 458, 465, 466
See application file for complete search history.

(56) References Cited

U.S. PATENT DOCUMENTS

| | | | |
|---|---|---|---|
| 7,873,385 B2 * | 1/2011 | Boireau | H04B 1/0057 455/553.1 |
| 7,929,912 B2 * | 4/2011 | Sherman | H04B 1/3805 455/41.2 |
| 8,407,358 B1 * | 3/2013 | Hess | H04L 29/06517 370/412 |
| 9,485,778 B2 * | 11/2016 | Linde | H04W 72/1215 |
| 9,544,813 B2 * | 1/2017 | Wasily | H04W 72/1215 |
| 2005/0226156 A1 * | 10/2005 | Keating | H04L 47/10 370/235 |

(Continued)

*Primary Examiner* — Kwang B Yao
*Assistant Examiner* — Nguyen H Ngo
(74) *Attorney, Agent, or Firm* — Schiff Hardin LLP

(57) ABSTRACT

This disclosure relates to a communication device, comprising: a first communication module configured to communicate data with a first communication partner device according to a first wireless technology; a second communication module configured to communicate data with a second communication partner device according to a second wireless technology; and a scheduling module configured to determine a parameter indicative of a receive data capacity of the first communication partner device based on the data communication with the first communication partner device, and to schedule the data communication with the first communication partner device and the data communication with the second communication partner device based on the parameter.

24 Claims, 6 Drawing Sheets

(56) References Cited

U.S. PATENT DOCUMENTS

| | | | |
|---|---|---|---|
| 2007/0025237 A1* | 2/2007 | Goto | H04M 1/2535 |
| | | | 370/216 |
| 2011/0312288 A1* | 12/2011 | Fu | H04B 1/406 |
| | | | 455/88 |
| 2013/0182650 A1* | 7/2013 | Kezys | H04W 72/1221 |
| | | | 370/329 |
| 2014/0161274 A1* | 6/2014 | Singamsetty | H04R 1/1041 |
| | | | 381/74 |

* cited by examiner

TECHNIQUES FOR SCHEDULING COMMUNICATION BASED ON RECEIVE DATA CAPACITY

FIELD

The disclosure relates to techniques for scheduling communication based on receive data capacity, in particular based on a parameter indicative of the receive data capacity. The disclosure particularly relates to a device and method for scheduling communication based on a jitter buffer depth of a communication partner device. The disclosure further relates to TDM scheduling of WiFi/LTE and Bluetooth station in the same mobile device based on jitter buffer depth of the Bluetooth peer device.

BACKGROUND

FIG. 1 shows a scenario 100 where a wireless station 101 includes several collocated wireless technology interfaces 103, 105 (e.g. Wi-Fi, Bluetooth, LTE) and there is a potential for mutual interference 106 between these wireless technologies. For example, a WiFi or LTE (or both) and a Bluetooth station in the same mobile device 101 (whether in the same or in different chips) may interfere 106 each other in the radio frequency (RF) domain (e.g. WiFi transmissions in 2.4 GHz band/LTE on FDD bands close to 2.4 Ghz interfere with BT reception), or may simply prevent each other from operating properly (e.g. the baseband/RF architecture do not support simultaneous transmission/reception and performance while both COMMs working together is lower than working separately). The disclosure presents a scheme improves facilitates communication in such scenarios.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
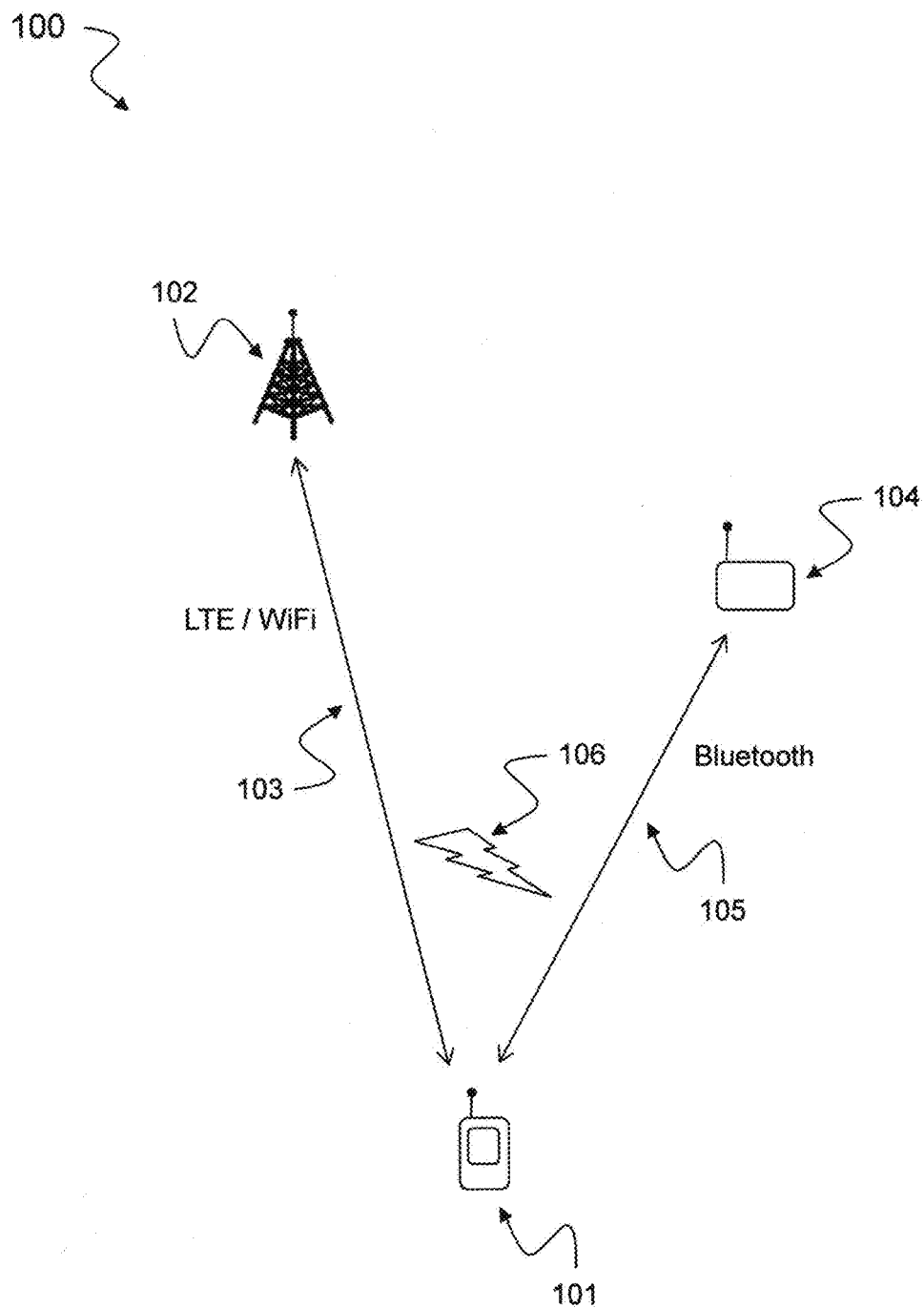
FIG. 1 is a schematic diagram illustrating a mobile device 101 with two communication modules for communication with an LTE or WiFi network 102 and a Bluetooth access point 104.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
LTE: Long Term Evolution
WiFi: Wireless Fidelity, wireless LAN
BT: Bluetooth
TDM: Time Division Multiplex
FDD: Frequency Division Duplex
DRX: Discontinuous Reception
A2DP: Advanced Audio Distribution Profile
BT BR: Bluetooth Basic Rate
BT EDR: Bluetooth Enhanced Data Rate
DUT: Device under Test
BTOE: Bluetooth other End, e.g. the BT speaker link partner
COMM: communication module
NDP: Neighbor Discovery Protocol
UX: User Experience
A2DP: Advanced Audio Distribution Profile (BT Profile)
OPP: Object Push Profile (BT Profile)

It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as LTE, in particular LTE-A and/or OFDM and successor standards such as 5G. The methods are also applicable for high speed communication standards from the 802.11 family according to the WiFi alliance, e.g. 802.11ad and successor standards. The methods and devices described below may be implemented in electronic devices such as cellular handsets and mobile or wireless devices communicating with access points and/or base stations. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The disclosure described in the following is relevant for platforms that support non-synchronous traffic profiles without real time latency requirements, that can be buffered and transferred in bursts of data (to allow time division). For example: A mobile device using BT BR/EDR A2DP Source active profile working simultaneously with Wi-Fi traffic and/or FDD bands LTE Traffic under DRX periodic communication.

The disclosure described in the following is particularly relevant for platforms, e.g. devices and systems, that support Bluetooth technology and Bluetooth profiles. In order to use Bluetooth technology, a device must be compatible with the subset of Bluetooth profiles (often called services) necessary to use the desired services. A Bluetooth profile is a specification regarding an aspect of Bluetooth-based wireless communication between devices. It resides on top of the Bluetooth Core Specification and (optionally) additional protocols. The way a device uses Bluetooth technology depends on its profile capabilities. The profiles provide standards which manufacturers follow to allow devices to use Bluetooth in the intended manner. At a minimum, each profile specification contains information on the following topics: Dependencies on other formats; Suggested user interface formats; and Specific parts of the Bluetooth protocol stack used by the profile.

The Advanced Audio Distribution Profile (A2DP) is a BT profile that is of particular relevance for this disclosure. This profile defines how multimedia audio can be streamed from one device to another over a Bluetooth connection (it is also called Bluetooth Audio Streaming). For example, music can be streamed from a mobile phone, to a wireless headset, hearing aid, car audio, or from a laptop/desktop to a wireless headset; also, voice can be streamed from a microphone device to a recorder on a PC. The Audio/Video Remote Control Profile (AVRCP) is often used in conjunction with A2DP for remote control on devices such as headphones, car audio systems, or stand-alone speaker units. These systems often also implement Headset (HSP) or Hands-Free (HFP) profiles for telephone calls, which may be used separately.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

FIG. 1 is a schematic diagram illustrating a mobile device 101 with two communication modules for communication with an LTE or WiFi network 102 and a Bluetooth access point 104 or another Bluetooth station 104. The mobile device 101 includes several collocated wireless technology interfaces 103, 105 (e.g. Wi-Fi, Bluetooth, LTE) and there is a potential for mutual interference 106 between these wireless technologies. For example, a WiFi or LTE (or both) and a Bluetooth station in the same mobile device 101 (whether in the same or in different chips) may interfere 106 each other in the radio frequency (RF) domain (e.g. WiFi transmissions in 2.4 GHz band/LTE on FDD bands close to 2.4 Ghz interfere with BT reception), or may simply prevent each other from operating properly (e.g. the baseband/RF architecture do not support simultaneous transmission/reception and performance while both COMMs working together is lower than working separately). The disclosure presents a scheme that improves communication in such scenarios.

A possible solution to this coexistence problem is the use of time division multiplexing (TDM), where traffic for coexisting technologies is separated in time. For traffic patterns where traffic is periodic with a relatively long period (in the order to tens of milliseconds), time multiplexing can be coordinated a priori by using power save techniques to ensure one technology will not be active while the other one is (WiFi—NDP control packets for AP with PM bit set to '1', for LTE use DRX method to request periodic sleep periods). For A2DP profile, since the audio stream is one way and the latency requirements are relatively not strict, the Far end BT Device (also called BT partner device) usually use Jitter buffer to ensure good User experience. The use of Jitter buffer at the far end side allows the DUT (Device under Test, i.e. the mobile device 101) to aggregate the BT traffic into bursts and build infrastructure for periodic TDM traffic with the other communication activity in the same band (i.e. Wi-Fi). The interval period of the TDM infrastructure is important for several reasons. Firstly it can impact the efficiency of the overall Traffic behavior since there is overhead involved to enter/exit power save mode (mainly refers to WiFi). Secondly, it allows better granularity to sync BT traffic with LTE DRX patterns which are using strict intervals values.

The exact maximum period allowed to be used for time spacing in such case depends on the link partner jitter buffer depth, a parameter not communicated between the two BT link partners therefore not being known to the A2DP source (DUT). This results in cases where the time interval in use is not optimized for the overall system (i.e. too short creating non efficient overhead for the system, or too long causing UX impact for the user—bad audio)

In some aspect, the disclosure focuses on a simple method, using a control flow defined by the BT standard as part of the A2DP profile as described hereinafter. Such method enables to measure the link partner buffer size dynamically per link partner type, at the beginning of the traffic transfer, without impact on User experience. Therefore it allows the DUT (A2DP Source) to: use optimal period (as long as possible) maximize traffic data rate and minimizing overhead of enter/exit power save mode of the other co-located communications devices (Wi-Fi or LTE), allow the DUT granularity to align to LTE DRX selected interval cycle, and prevent option to impact UX of Far end BT device in case the selected interval is too long.

Figure 2:
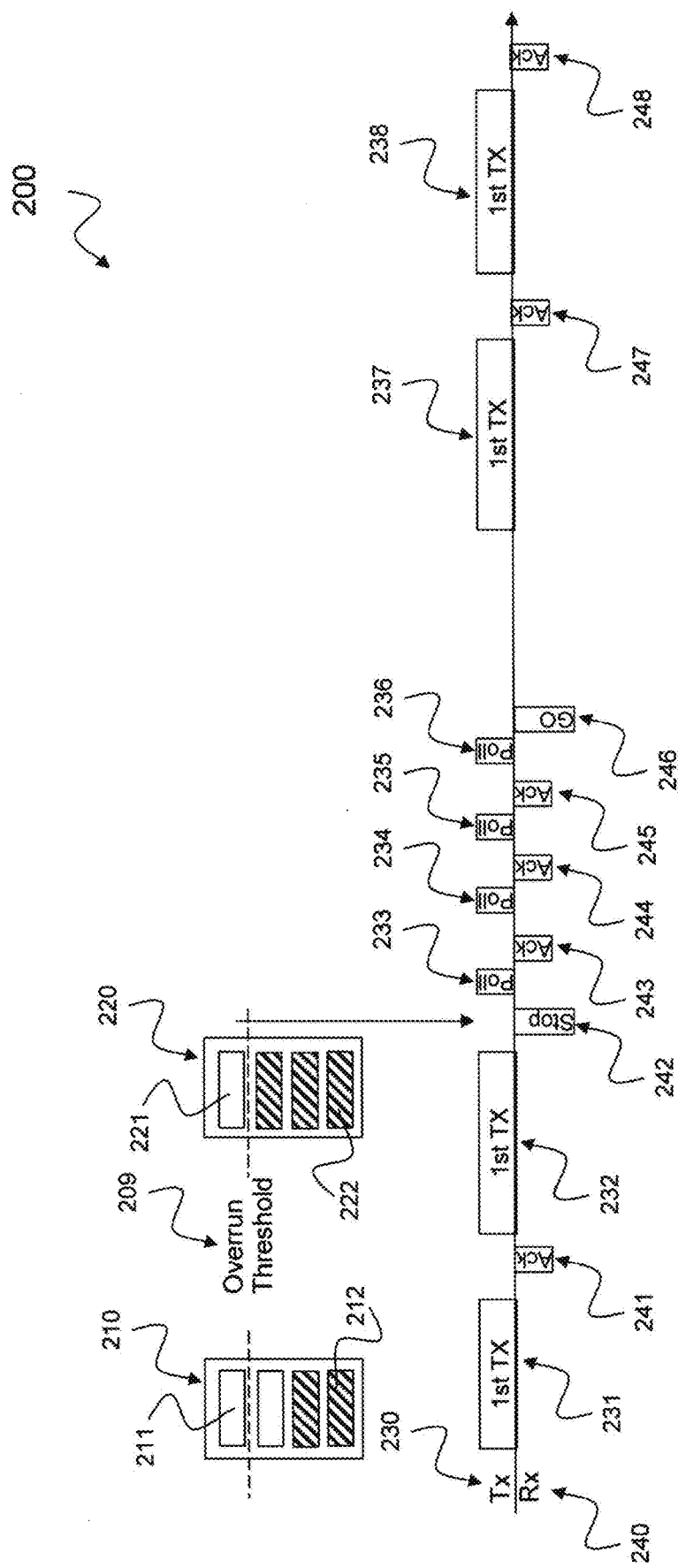
FIG. 2 is a schematic diagram illustrating the regular behavior of a Stop/Go flow 200 for Bluetooth data communication.

FIG. 2 is a schematic diagram illustrating the regular behavior of a Stop/Go flow 200 for Bluetooth data communication. The figure illustrates the time axis for transmission (Tx) 230 and reception (Rx) 240 by the DUT, e.g. the Bluetooth module in mobile device 101 as shown in FIG. 1. On the upper side of FIG. 2, the far end device jitter buffer status 210, 220 for different times is depicted, e.g. of jitter buffer implemented in the far-end communication device, e.g. the Bluetooth partner device 104 shown in FIG. 1. FIG. 2 shows the scenario where BT A2DP source, i.e. far end BT device, e.g. BT partner device 104 as shown in FIG. 1, is master of communication, BT use time is shared with Wi-Fi (e.g. WiFi or LTE communication 103 shown in FIG. 1) and sending A2DP data is performed in bursts.

At the beginning (on left side of FIG. 2), i.e. at some time during communication, the jitter buffer status 210 is partially filled, i.e. some buffers 212 of jitter buffer are filled while other buffers 211 of jitter buffer are empty. Transmission starts (or continues) with first transmissions (TX) 231 and Acknowledgement 241 is received for this TX 231. Then further first TX 232 is transmitted which causes jitter buffer overrun (in this example) in the far end device. Jitter buffer overrun may be detected when overrun threshold 209 is crossed by actual filling of jitter buffer. After the two TX 231 and 232, jitter buffer status 220 is crossing the overrun threshold 209. This may happen when most of the buffers 222 are filled while there may still be some small portion of buffers 221 that are empty. In the example shown in FIG. 2, the overrun threshold is crossed when three buffers 222 are filled while one buffer 221 still is empty. This, however, is only an example. Any other number (or relation) may be used for filled buffers 222 and empty buffers 221, e.g. 1:1, 2:1, 3:2, 4:1, 4:3, 5:1, 10:1, 100:1, etc.

When overrun threshold 209 is crossed, a stop event 242 is received by the DUT and the DUT initiates a series of poll events 233, 234, 235, 236 to check jitter buffer status in the far-end device. The series of poll events 233, 234, 235, 236 is answered by the far end device with a series of Acknowledgements 243, 244, 245 and a Go event 246 which indicates that jitter buffer status is again below overrun threshold 209 or below a second threshold indicating that enough free buffers are available in the far end jitter buffer for continuing communication. After some time, DUT can continue transmission by sending first TX 237 and 238 which are acknowledged by far end device with Acks 247 and 248.

Figure 3:
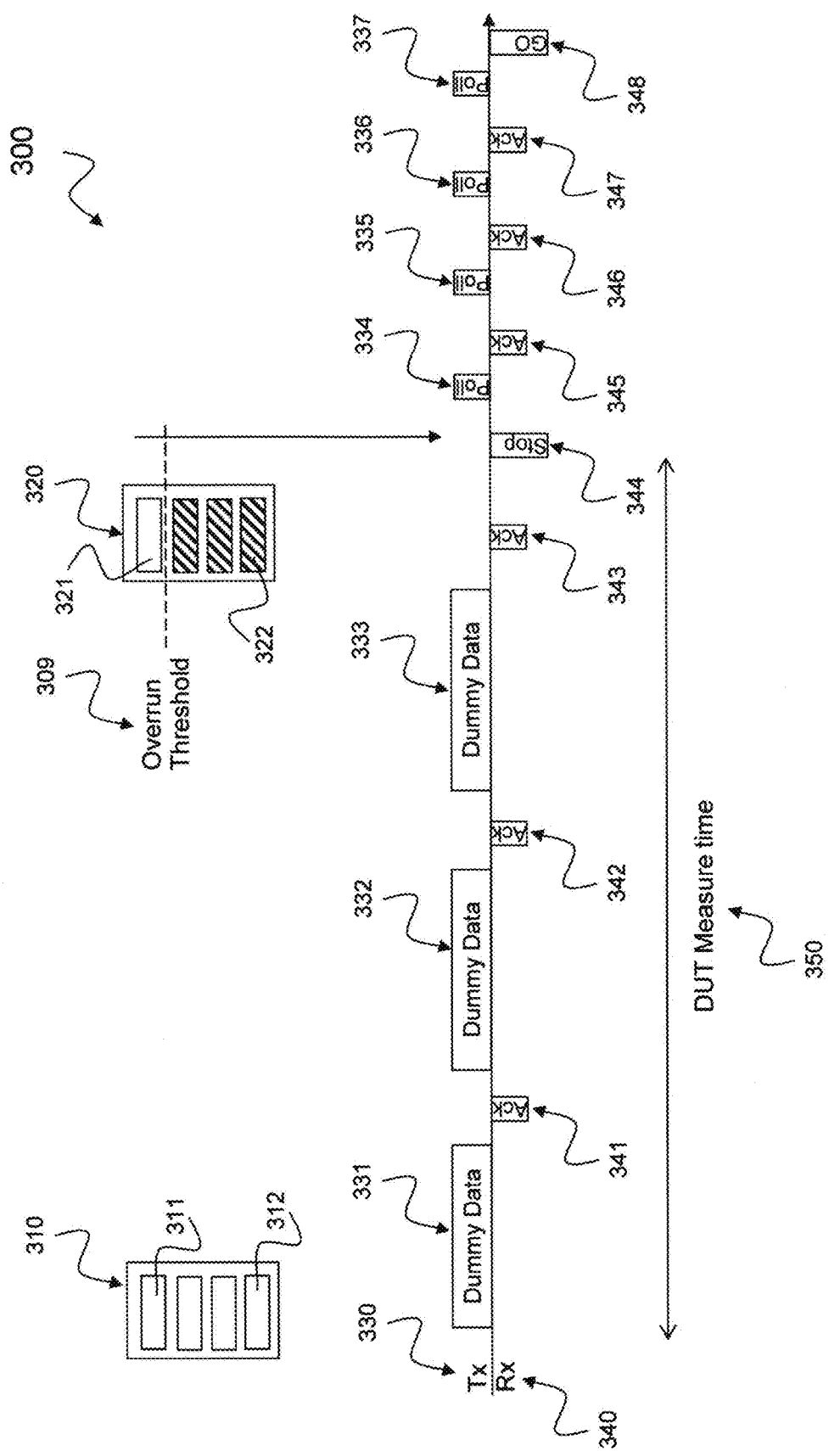
FIG. 3 is a schematic diagram illustrating a mechanism 300 according to the disclosure how to use the Bluetooth Stop/Go flow to measure the far end buffer depth.

FIG. 3 is a schematic diagram illustrating a mechanism 300 according to the disclosure how to use the Bluetooth Stop/Go flow to measure the far end buffer depth. The figure illustrates the same scenario as described above with respect to FIG. 2, i.e., the time axis for transmission (Tx) 330 and reception (Rx) 340 by the DUT, e.g. the Bluetooth module in mobile device 101 as shown in FIG. 1. On the upper side of FIG. 3, the far end device jitter buffer status 310, 320 for different times is depicted. FIG. 3 shows the same scenario as FIG. 2, i.e., BT A2DP source, i.e. far end BT device, e.g. BT partner device 104 as shown in FIG. 1, is master of communication. However, instead of real data, BT DUT 101 sends bursts of dummy data until Flow Stop 344 event is received. BT DUT calculates the BTOE (BT partner device 104) buffer size based on the time until Flow Stop 344 event is received.

The flow starts with link establishment when all buffers 312, 311 of jitter buffer are empty, i.e. jitter buffer status 310 is empty. Transmission starts with a series of dummy data (e.g. silent data) transmissions (TX) 331, 332, 333 by BT DUT 101 which are acknowledged by far end BT device 104 with respective Acks 341, 342, 343. After some time during communication far end BT device 104 goes in jitter buffer overrun. Jitter buffer overrun may be detected when overrun threshold 309 is crossed by actual filling of jitter buffer. This may happen when most of the buffers 222 are filled while there may still be some small portion of buffers 221 that are empty, e.g. as described in the scenario of FIG. 2.

When overrun threshold 309 is crossed, a stop flow 344 event is received by the DUT 101 and the DUT 101 initiates a series of poll events 334, 335, 336, 337 to check jitter buffer status in the far-end device 104, e.g. as described above with respect to FIG. 2. The series of poll events 334, 335, 336, 337 is answered by the far end device 104 with a series of Acknowledgements 345, 346, 347 and a Go flow event 348 which indicates that jitter buffer status is again below overrun threshold 309 or below a second threshold indicating that enough free buffers are available in the far end jitter buffer for continuing communication, e.g. as shown with respect to FIG. 2.

In general, non-synchronous streaming protocols typically include flow control mechanisms (e.g. as shown in FIGS. 2 and 3) that can be used to estimate the jitter buffer in use. Specifically, a STOP/GO mechanism is defined in the BT standard as part of the commonly used BT A2DP profile. A2DP Profile standard specification includes mechanism to control a potential overrun of the Far end (receiver) buffer 220, 320—Flow of STOP/GO 344, 348 for source (DUT) traffic. The disclosure uses this infrastructure to measure the depth of traffic of the far end device (e.g. device 104 shown in FIG. 1).

In the link establishment phase, the DUT 101 will send bursts (back2back) of data packets 231, 232 (as shown in FIG. 2) stored beforehand or dummy data 331, 332, 333 (as shown in FIG. 3) (all zeroed data—represent silent), or combination of both, to the far end device 104. Once the far end device Jitter buffer will reach the overrun limit 309, it will send to the DUT a frame of STOP 344. The DUT 101 will measure the number of packets transmitted until the STOP 344 indication to estimate the depth of the far end Jitter buffer. Based on the depth of the jitter buffer the DUT 101 will choose the optimal interval for the TDM scheme (e.g. for LTE—matching to cycle of DRX of multiple of it, e.g. for WiFi the longest possible without creating under-run on the far end device). The selected period creates the infrastructure of time division between the A2DP required BW (bandwidth) traffic, and the other communication device (LTE or WiFi) that can use the airtime in between the BT Traffic bursts. FIG. 3 illustrates the flow how to measure the far end jitter buffer using as example Dummy TX data packets 331, 332, 333 (as mentioned previously it can be delayed stored real Data, or combination of real data and dummy packets). While FIG. 2 shows regular behavior of the STOP/GO flow, FIG. 3 illustrates how the flow can be used to measure the far end buffer depth.

Current solutions for TDM schemes between co-located COMMs use a fixed pre-defined interval for the TDM infrastructure. Such solutions, however, have inherent limits in that they are not optimized from interoperability perspective: If the interval is chosen too long, it may cause user experience issues, if the interval is chosen too short it limits the efficiency of the system. In addition for LTE communication system, the DRX infrastructure may have other limits that will require to choose longer periods to align with the DRX cycle.

In the following example, a calculated impact of the interval on a WiFi—BT TDM efficiency is illustrated. Device A uses interval of 50 ms (used by many combo devices in the market), and the Far end device Jitter buffer allows interval of 100 ms (very common on available mid-high end speakers). Overhead of Wi-Fi enter and exit power save mode versus AP is assumed to take overall about 7 ms. For 50 ms, current A2DP codec (WIN RS3) will use 3 2DH5 packets, i.e. about 10 ms, and WiFi will use about 33 ms. This results in WiFi efficiency of 33/50=66% of Stand-alone performance. For 100 ms the equivalent numbers are 73/100=73% of Stand-alone performance, i.e. 10% boost in WiFi TpT (throughput).

For LTE, the DRX patterns are strict, and the selected interval may need to be multiple or sub multiple of the DRX cycle, the granularity of known the maximum allowed interval can allow better alignment between the BT scheduled data bursts and the DRX paging intervals and Data periods.

In the following example, a method how to extract the link partner buffer depth from the duration it took to get the Stop 344 indication received is described. The following parameters may be determined before calculating the buffer size:

DURATION: time it took from first dummy data transmission until STOP indication received;

NO_OF_FRAMES: the number of frames DTU transmitted until DUT got the STOP 344 indication (not including retransmission which are not getting the link partner buffer to be loaded);

FRAME_RATIO: the ratio between single packet DUT uses to 1 kb data unit (rough estimation) according to: 3DH5==1, 2DH5, 3DH3==1.5, DH5, 3DH2=2, DH3=2.5, DH1=3;

DATA_RATE: typical rate for A2DP "consumption"—units are 1 Kb/ms. In other words, how long it takes the link partner to play 1 Kbps data. Usually it is 15 (i.e. 1 Kb every 15 ms).

The buffer size may be calculated according to the following method (formula):

Determine
(DURATION/DATA_RATE)
as the number of data "consumed" by link partner during the process;

Determine
(NO_OF_FRAMES/FRAME_RATIO)
as the effective transmitted data-rate, scaled to ikbps units; and Determine $$BUFFER\_SIZE=(NO\_OF\_FRAMES/FRAME\_RATIO)-(DURATION/DATA\_RATE)$$

The following acronyms apply:
DUT denotes the Device under test, i.e., the device that is doing the tie division between the different COMMs. BTOE denotes the BT other End, e.g. the BT speaker link partner. 3DH5: BT has several types of frames structure and modulation: '3' means the modulation type. Possible values are 1 (called also basic rate), 2 and 3. The number represents the maximum rate (1/2/3 Mbps). '5' means number of slots used, possible number are 1,3,5.

The idea in this example is to use the most effective frame type to make the link partner to reach its overrun threshold. In this case the 3DH5 is used which is the packet that can transmit the most data. Depending on the link partner abilities also other frame types can be used.

Different streaming profiles may be applied, e.g. A2DP as described above and also OPP (Object Push Profile). However, there are advantages of A2DP over OPP as described in the following. The time multiplexing technique with BT can apply to profiles that can absorb latency. They are called ACL (asynchronous layer traffic). A2DP is one way, music streaming is an example for it. OPP is also an example, but OPP does not have limits for the time division interval. Since it is file transfer there is no risk to hear clicks if the interval will be long. Therefore, A2DP is preferred over OPP. Besides, A2DP is very commonly used while OPP is almost not used at all.

Figure 4:
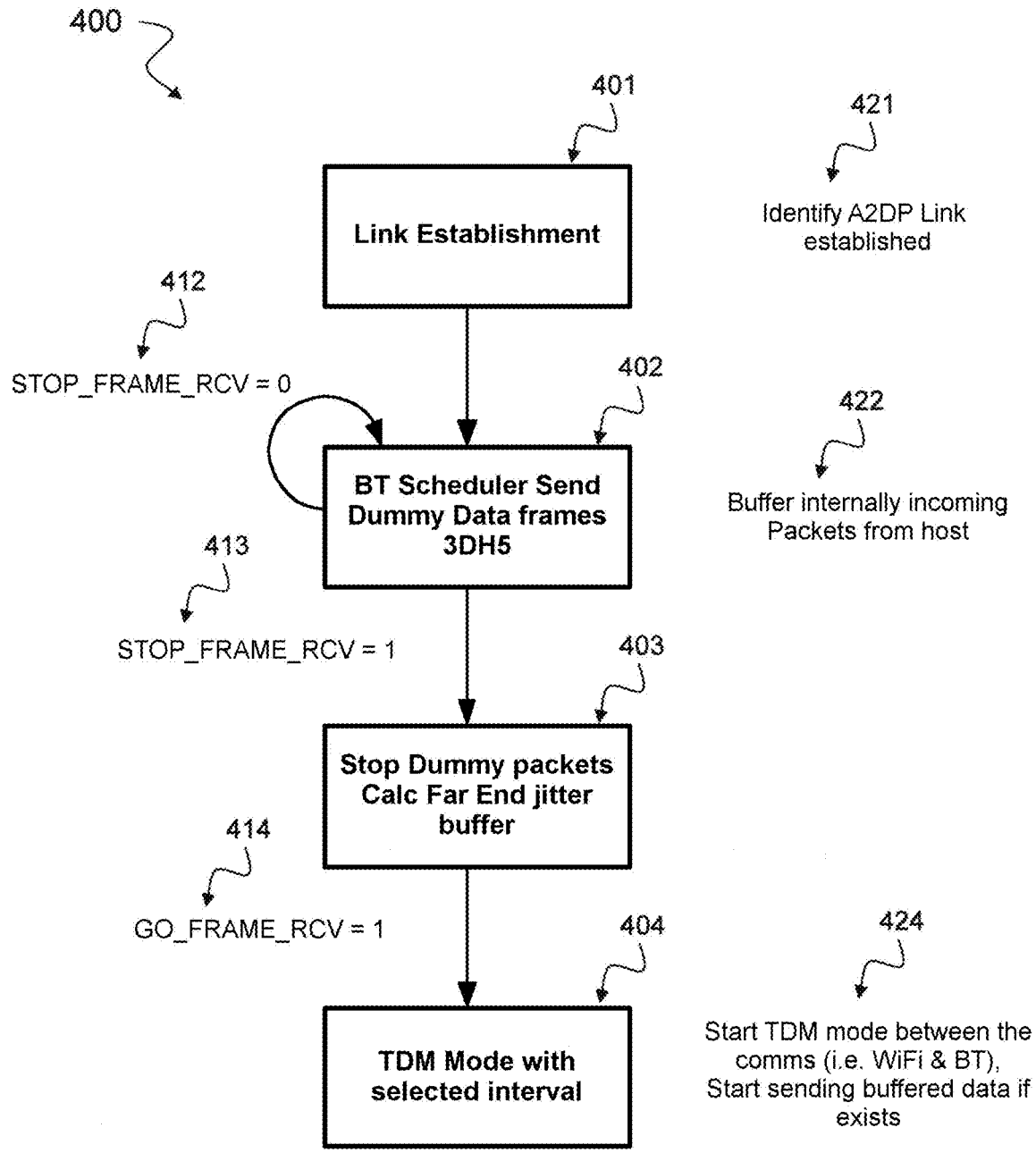
FIG. 4 is a block diagram illustrating a high level flow 400 to estimate the far end jitter buffer depth based on sending dummy buffered traffic until STOP frame is received from Bluetooth peer device according to the disclosure.

FIG. 4 is a block diagram illustrating a high level flow 400 to estimate the far end jitter buffer depth based on sending dummy buffered traffic until STOP frame is received from Bluetooth peer device according to the disclosure.

FIG. 4 illustrates in high level the flow to estimate the far end jitter buffer depth based on sending dummy buffered traffic until STOP frame received from BT peer device, e.g. BT device 104 depicted in FIG. 1, e.g. as described above with respect to FIGS. 2 and 3. Similar scheme can be applied using stored real Data traffic or combination of both, e.g. as described above with respect to FIG. 3.

The scheme or method includes the following steps:
1) Once link established 401 is identified by BT device 421, the BT scheduler will start send back2back traffic 402 to fill far end Jitter buffer (assumed DUT is master) as long as no Stop frame indication is received 412.
  1a) Traffic can be based on delayed internally stored real data from host (DUT wait until internal buffer is full and then transmit back2back all the data).
  1b) Traffic can be based on dummy data—all zero (silent) packets (331, 332, 333 in FIG. 3).
  1c) Traffic can be based on a combination of cases 1a) and 1b) above.
2) The Scheduler will monitor incoming frames 422 from Far end and once STOP command (344 in FIG. 3) received 413 it will stop sending data frames 403 and will wait for GO command 414 (348 in FIG. 3).
3) The number of frames sent till the STOP indication 413 arrived will be used to estimate the far end Jitter buffer 403. The conversion can be backed up on prior tested devices in lab, using this mechanism. i.e.—measure the maximum interval allowed before user interface impact and correlate to the amount of data sent before STOP indication 413.
4) Once GO indication received 414 from far end, the BT device will move to the TDM mode of work with the calculated interval 404. TDM mode is started 424 between the communication modules (i.e. WiFi/LTE and BT). Sending of buffered data is started if such data exists.

Figure 5:
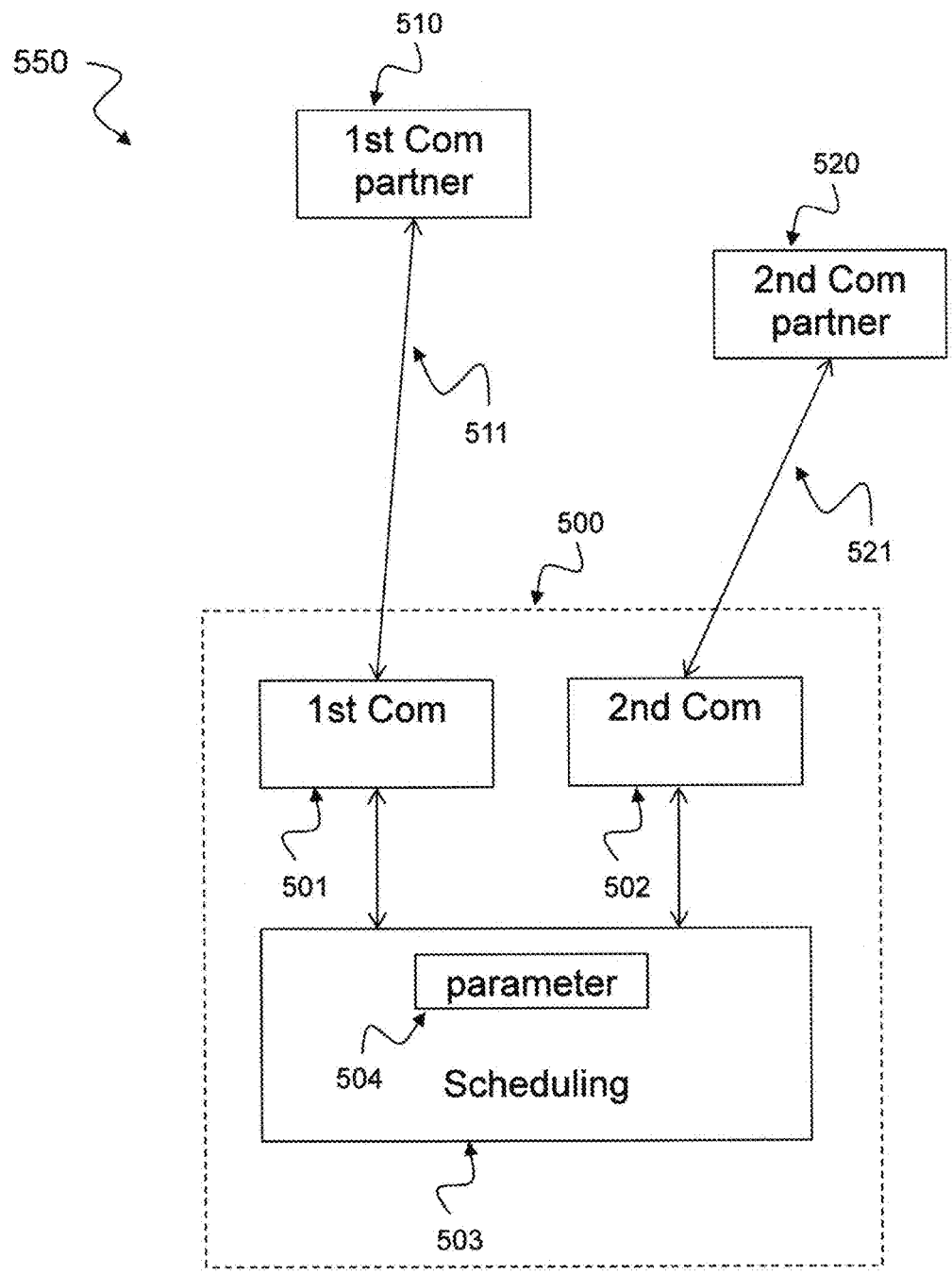
FIG. 5 is a block diagram of a communication device 500 with first communication module, second communication module and scheduling module according to the disclosure.

FIG. 5 is a block diagram of a communication system 550 with a communication device 500 with first communication module, second communication module and scheduling module according to the disclosure. The communication device 500 is a general representation for a DUT as described above with respect to FIGS. 2 to 4, e.g. for a mobile device 101 as depicted in FIG. 1. The WiFi transmission described above may be represented by a first wireless technology, while Bluetooth transmission as described above may be represented by a second wireless technology. The jitter buffer depth described above may be represented by a parameter indicative of a receive data capacity of a communication partner device. The TDM mode transmission may be represented by a general scheduling of communication based on the determined parameter.

The communication device 500 comprises a first communication module 501, a second communication module 502 and a scheduling module 503. The first communication module 501 is configured to communicate data with a first communication partner device 510 according to a first wireless technology 511. The second communication module 502 is configured to communicate data with a second communication partner device 520 according to a second wireless technology 521. The scheduling module 503 is configured to determine a parameter 504 indicative of a receive data capacity of the first communication partner device 510 based on the data communication with the first communication partner device 510, and to schedule the data communication with the first communication partner device 510 and the data communication with the second communication partner device 520 based on the parameter 504.

The first communication module 501 may be a Bluetooth module in a DUT, e.g. mobile device 101 as described above with respect to FIGS. 1 to 4. The second communication module 502 may be a WiFi or LTE module in the DUT, e.g. mobile device 101 as described above with respect to FIGS. 1 to 4. The first communication partner device 510 may be a Bluetooth device, e.g. BT peer or BT access point or BT station as described above with respect to FIGS. 1 to 4. The second communication partner device 520 may be a WiFi device, e.g. a network node in a WiFi network or an LTE device, e.g. a network node in an LTE network as described above with respect to FIG. 1.

The parameter 504 may comprises a receive buffer depth of the first communication partner device 510, e.g. as described above with respect to FIGS. 2 to 4. The scheduling module 503 may be configured to schedule the data communication with the first communication partner device 510 and the second communication partner device 520 based on Time Division Multiplex (TDM). The scheduling module 503 may be configured to determine an interval period of the TDM based on the parameter 504.

The first wireless technology 511 may comprise Bluetooth, for example. The second wireless technology may comprise WiFi or LTE, for example.

The scheduling module 503 may be configured to determine the parameter 504 based on data flow control mechanisms implemented by a communication protocol of the first wireless technology 511, e.g. according to Bluetooth data flow mechanisms as described above with respect to FIGS. 3 and 4.

The scheduling module 503 may be configured to determine the parameter 504 at link establishment between the first communication module 501 and the first communication partner device 510, e.g. as described above with respect to FIGS. 3 and 4.

The scheduling module 503 may be configured to determine the parameter 504 based on sending dummy data to the first communication partner device 510, e.g. as described above with respect to FIGS. 3 and 4.

The scheduling module 503 may be configured to determine the parameter 504 based on a buffer overflow event message or a stop flow command received from the first communication partner device, e.g. as described above with respect to FIGS. 3 and 4.

The scheduling module 503 may be configured to determine the parameter 504 based on a time it takes for sending bursts of data until a buffer overflow event message or a flow stop command is received or based on a number of frames of data sent until the buffer overflow event message or the flow stop command is received, e.g. as described above with respect to FIGS. 3 and 4.

The first communication module 501 may be configured to stream audio data from the first communication partner device 510. The first communication module 501 may be configured to stream the audio data based on an Advanced Audio Distribution Profile (A2DP), e.g. as described above with respect to FIGS. 3 and 4.

The scheduling module 503 may be configured to enable a TDM transmission of the first communication module 501 and the second communication module 502 after reception of a go command from the first communication partner device 510, e.g. as described above with respect to FIGS. 3 and 4.

The first communication module 501 and the second communication module 502 may be collocated in the communication device 500, e.g. on single or different chip or board in the communication device 500.

In an exemplary implementation, the communication device 500 comprises a Bluetooth communication module 501, a second communication module 502 and a scheduling module 503. The Bluetooth communication module 501 is configured to communicate data with a Bluetooth partner device 510 according to a Bluetooth technology 511. The second communication module 502 is configured to communicate data with a second communication partner device 520 according to one of a WiFi or an LTE technology. The scheduling module 503 is configured to determine a receive data depth 504 of the Bluetooth partner device 510 based on monitoring data traffic between the Bluetooth communication module 501 and the Bluetooth partner device 510, and to schedule the data communication with the Bluetooth partner device 510 and the data communication with the second communication partner device 520 based on the receive data depth 504.

Figure 6:
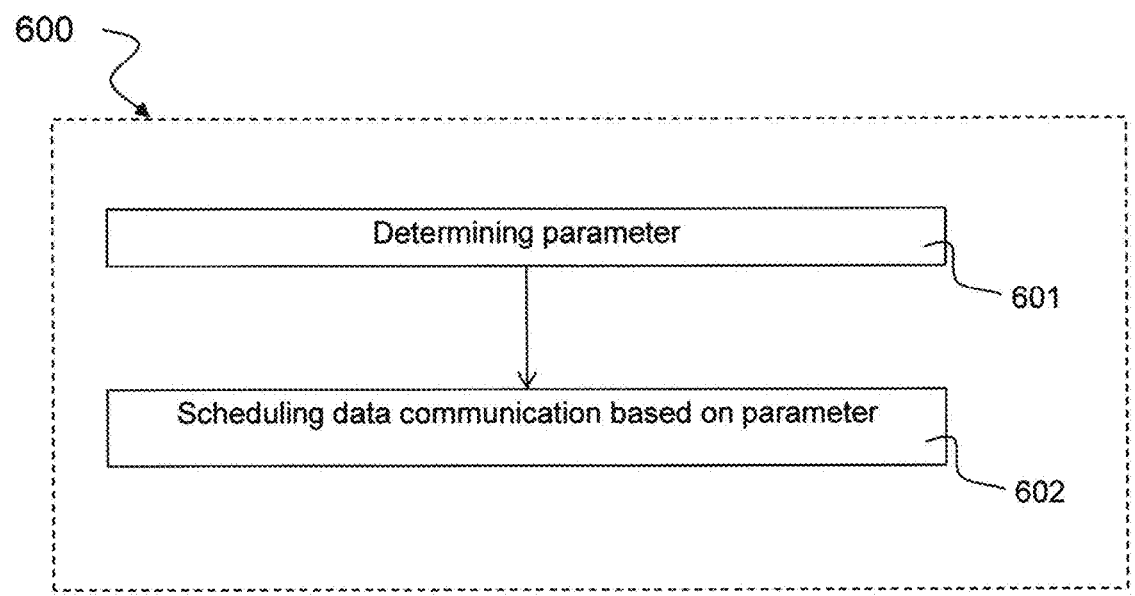
FIG. 6 is a schematic diagram illustrating a method 600 for scheduling data communication according to the disclosure.

FIG. 6 is a schematic diagram illustrating a method 600 for scheduling data communication according to the disclosure. The method 600 can perform the steps corresponding to the functionality of the the modules 501, 502, 503 described above with respect to FIG. 5.

The method 600 is for scheduling data communication of a communication device, e.g. a communication device 500 described above with respect to FIG. 5, comprising a first communication module 501 for communicating data with a first communication partner device 510 according to a first wireless technology 511 and a second communication module 502 for communicating data with a second communication partner device 520 according to a second wireless technology 521.

The method 600 comprises determining 601 a parameter 504 indicative of a receive data capacity of the first communication partner device 510 based on the data communication with the first communication partner device 510.

The method 600 comprises scheduling 602 the data communication with the first communication partner device 510 and the data communication with the second communication partner device 520 based on the parameter 504.

The devices and systems described in this disclosure may be implemented as Digital Signal Processors (DSP), microcontrollers or any other side-processor or hardware circuit on a chip or an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the methods described above with respect to FIGS. 3, 4 and 6 and the computing blocks described above with respect to FIG. 5. Such a computer program product may include a non-transient readable storage medium storing program code thereon for use by a processor, the program code comprising instructions for performing the methods or the computing blocks as described above.

EXAMPLES

The following examples pertain to further embodiments. Example 1 is a communication device, comprising: a first communication module configured to communicate data with a first communication partner device according to a first wireless technology; a second communication module configured to communicate data with a second communication partner device according to a second wireless technology; and a scheduling module configured to determine a parameter indicative of a receive data capacity of the first communication partner device based on the data communication with the first communication partner device, and to schedule the data communication with the first communication partner device and the data communication with the second communication partner device based on the parameter.

In Example 2, the subject matter of Example 1 can optionally include that the parameter comprises a receive buffer depth of the first communication partner device.

In Example 3, the subject matter of any one of Examples 1-2 can optionally include that the scheduling module is configured to schedule the data communication with the first communication partner device and the second communication partner device based on Time Division Multiplex (TDM).

In Example 4, the subject matter of Example 3 can optionally include that the scheduling module is configured to determine an interval period of the TDM based on the parameter.

In Example 5, the subject matter of any one of Examples 1-2 can optionally include that the first wireless technology comprises Bluetooth.

In Example 6, the subject matter of any one of Examples 1-2 can optionally include that the second wireless technology comprises WiFi or LTE.

In Example 7, the subject matter of any one of Examples 1-2 can optionally include that the scheduling module is configured to determine the parameter based on data flow control mechanisms implemented by a communication protocol of the first wireless technology.

In Example 8, the subject matter of any one of Examples 1-2 can optionally include that the scheduling module is configured to determine the parameter at link establishment between the first communication module and the first communication partner device.

In Example 9, the subject matter of any one of Examples 1-2 can optionally include that the scheduling module is configured to determine the parameter based on sending dummy data to the first communication partner device.

In Example 10, the subject matter of any one of Examples 1-2 can optionally include that the scheduling module is configured to determine the parameter based on a buffer overflow event message or a stop flow command received from the first communication partner device.

In Example 11, the subject matter of Example 10 can optionally include that the scheduling module is configured to determine the parameter based on a time it takes for sending bursts of data until the buffer overflow event message or the flow stop command is received or based on a number of frames of data sent until the buffer overflow event message or the flow stop command is received.

In Example 12, the subject matter of any one of Examples 1-2 can optionally include that the first communication module is configured to stream audio data from the first communication partner device.

In Example 13, the subject matter of Example 12 can optionally include that the first communication module is configured to stream the audio data based on an Advanced Audio Distribution Profile (A2DP).

In Example 14, the subject matter of any one of Examples 1-2 can optionally include that the scheduling module is configured to enable a TDM transmission of the first communication module and the second communication module after reception of a go command from the first communication partner device.

In Example 15, the subject matter of any one of Examples 1-2 can optionally include that the first communication module and the second communication module are collocated in the communication device.

Example 16 is a communication device, comprising: a Bluetooth communication module configured to communicate data with a Bluetooth partner device according to a Bluetooth technology; a second communication module configured to communicate data with a second communication partner device according to one of a WiFi or an LTE technology; and a scheduling module configured to determine a receive data depth of the Bluetooth partner device based on monitoring data traffic between the Bluetooth communication module and the Bluetooth partner device, and to schedule the data communication with the Bluetooth partner device and the data communication with the second communication partner device based on the receive data depth.

In Example 17, the subject matter of Example 16 can optionally include that the scheduling module is configured to schedule the data communication with the Bluetooth partner device and the second communication partner device based on Time Division Multiplex (TDM).

In Example 18, the subject matter of Example 17 can optionally include that the scheduling module is configured to determine an interval period of the TDM based on the receive buffer depth.

In Example 19, the subject matter of any one of Examples 16-17 can optionally include that the scheduling module is configured to determine the receive buffer depth based on flow control mechanisms implemented by the Bluetooth technology.

In Example 20, the subject matter of any one of Examples 16-17 can optionally include that the Bluetooth module is configured to stream audio data from the Bluetooth partner device.

In Example 21, the subject matter of Example 20 can optionally include that the Bluetooth module is configured to stream the audio data based on an Advanced Audio Distribution Profile (A2DP).

In Example 22, the subject matter of any one of Examples 16-17 can optionally include that the scheduling module is configured to determine the receive buffer depth at link establishment between the Bluetooth module and the Bluetooth partner device.

Example 23 is a method for scheduling data communication of a communication device comprising a first communication module for communicating data with a first communication partner device according to a first wireless technology and a second communication module for communicating data with a second communication partner device according to a second wireless technology, the method comprising: determining a parameter indicative of a receive data capacity of the first communication partner device based on the data communication with the first communication partner device; and scheduling the data communication with the first communication partner device and the data communication with the second communication partner device based on the parameter.

In Example 24, the subject matter of Example 23 can optionally include that the parameter comprises a receive buffer depth of the first communication partner device.

In Example 25, the subject matter of any one of Examples 23-24 can optionally include: scheduling the data communication with the first communication partner device and the second communication partner device based on Time Division Multiplex (TDM).

In Example 26, the subject matter of Example 25 can optionally include: determining an interval period of the TDM based on the parameter.

In Example 27, the subject matter of any one of Examples 23-24 can optionally include that the first wireless technology comprises Bluetooth.

In Example 28, the subject matter of any one of Examples 23-24 can optionally include that the second wireless technology comprises WiFi or LTE.

In Example 29, the subject matter of any one of Examples 23-24 can optionally include: determining the parameter based on monitoring data traffic between the first communication module and the first communication partner device.

In Example 30, the subject matter of any one of Examples 23-24 can optionally include: determining the parameter based on flow control mechanisms implemented by a communication protocol of the first wireless technology.

In Example 31, the subject matter of any one of Examples 23-24 can optionally include: determining the parameter at link establishment between the first communication module and the first communication partner device.

In Example 32, the subject matter of any one of Examples 23-24 can optionally include: determining the parameter based on a buffer overflow event message or a stop flow command received from the first communication partner device.

In Example 33, the subject matter of Example 32 can optionally include: determining the parameter based on a time it takes for sending bursts of data until the buffer overflow event message or the flow stop command is received or based on a number of frames of data sent until the buffer overflow event message or the flow stop command is received.

In Example 34, the subject matter of any one of Examples 23-24 can optionally include: determining the parameter based on sending dummy data to the first communication partner device.

In Example 35, the subject matter of any one of Examples 23-24 can optionally include: streaming, by the first communication module, audio data from the first communication partner device.

In Example 36, the subject matter of Example 35 can optionally include: streaming the audio data based on an Advanced Audio Distribution Profile (A2DP).

Example 37 is a device for scheduling data communication of a communication device comprising a first communication module for communicating data with a first communication partner device according to a first wireless technology and a second communication module for communicating data with a second communication partner device according to a second wireless technology, the device comprising: means for determining a parameter indicative of a receive data capacity of the first communication partner device based on the data communication with the first communication partner device; and means for scheduling the data communication with the first communication partner device and the data communication with the second communication partner device based on the parameter.

In Example 38, the subject matter of Example 37 can optionally include that the parameter comprises a receive buffer depth of the first communication partner device.

Example 39 is a computer readable non-transitory medium on which computer instructions are stored which when executed by a computer cause the computer to perform the method of any one of Examples 23 to 36.

Example 40 is a communication system, comprising: a first communication module configured to communicate data with a first communication partner device according to a first wireless technology; a second communication module configured to communicate data with a second communication partner device according to a second wireless technology; and a scheduling module configured to determine a parameter indicative of a receive data capacity of the first communication partner device based on the data communication with the first communication partner device, and to schedule the data communication with the first communication partner device and the data communication with the second communication partner device based on the parameter.

In Example 41, the subject matter of Example 40 can optionally include that the parameter comprises a receive buffer depth of the first communication partner device.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A communication device, comprising:
a first communication circuit configured to communicate data with a first communication partner according to a first wireless technology;
a second communication circuit configured to communicate data with a second communication partner according to a second wireless technology; and
a scheduling circuit configured to determine a parameter indicative of a receive data capacity of the first communication partner based on the data communication with the first communication partner, to schedule the data communication with the first communication partner and the data communication with the second communication partner based on the parameter, and to enable a TDM transmission of the first communication circuit and the second communication circuit after reception of a go command from the first communication partner.

2. The communication device of claim 1,
wherein the parameter comprises a receive buffer depth of the first communication partner.

3. The communication device of claim 1,
wherein the scheduling circuit is configured to schedule the data communication with the first communication partner and the second communication partner based on Time Division Multiplex (TDM).

4. The communication device of claim 3,
wherein the scheduling circuit is configured to determine an interval period of the TDM based on the parameter.

5. The communication device of claim 1,
wherein the first wireless technology comprises Bluetooth.

6. The communication device of claim 1,
wherein the second wireless technology comprises WiFi or LTE.

7. The communication device of claim 1,
wherein the scheduling circuit is configured to determine the parameter based on data flow control mechanisms implemented by a communication protocol of the first wireless technology.

8. The communication device of claim 1,
wherein the scheduling circuit is configured to determine the parameter at link establishment between the first communication circuit and the first communication partner.

9. The communication device of claim 1,
wherein the scheduling circuit is configured to determine the parameter based on sending dummy data to the first communication partner.

10. The communication device of claim 1,
wherein the scheduling circuit is configured to determine the parameter based on a buffer overflow event message or a stop flow command received from the first communication partner.

11. The communication device of claim 10,
wherein the scheduling circuit is configured to determine the parameter based on a time it takes for sending bursts of data until the buffer overflow event message or the flow stop command is received or based on a number of frames of data sent until the buffer overflow event message or the flow stop command is received.

12. The communication device of claim 1,
wherein the first communication circuit is configured to stream audio data from the first communication partner.

13. The communication device of claim 12,
wherein the first communication circuit is configured to stream the audio data based on an Advanced Audio Distribution Profile (A2DP).

14. The communication device of claim 1,
wherein the first communication circuit and the second communication circuit are collocated in the communication.

15. A communication device, comprising:
a Bluetooth communication circuit configured to communicate data with a Bluetooth partner according to a Bluetooth technology;
a second communication circuit configured to communicate data with a second communication partner according to one of a WiFi or an LTE technology; and
a scheduling circuit configured to determine a receive data depth of the Bluetooth partner based on monitoring data traffic between the Bluetooth communication circuit and the Bluetooth partner, to schedule the data communication with the Bluetooth partner and the data communication with the second communication partner based on the receive data depth, and to enable a TDM transmission of the first communication circuit and the second communication circuit after reception of a go command from the Bluetooth partner.

16. The communication device of claim 15,
wherein the scheduling circuit is configured to schedule the data communication with the Bluetooth partner and the second communication partner based on Time Division Multiplex (TDM).

17. The communication device of claim 16,
wherein the scheduling circuit is configured to determine an interval period of the TDM based on the receive data depth.

18. The communication device of claim 15,
wherein the scheduling circuit is configured to determine the receive data depth based on flow control mechanisms implemented by the Bluetooth technology.

19. The communication device of claim 15,
wherein the Bluetooth communication circuit is configured to stream audio data from the Bluetooth partner.

20. The communication device of claim 19,
wherein the Bluetooth communication circuit is configured to stream the audio data based on an Advanced Audio Distribution Profile (A2DP).

21. The communication device of claim 15,
wherein the scheduling circuit is configured to determine the receive data depth at link establishment between the Bluetooth communication circuit and the Bluetooth partner.

22. A method for scheduling data communication of a communication device comprising a first communication circuit for communicating data with a first communication partner according to a first wireless technology and a second communication circuit for communicating data with a second communication partner according to a second wireless technology, the method comprising:
determining a parameter indicative of a receive data capacity of the first communication partner based on the data communication with the first communication partner; and
scheduling the data communication with the first communication partner and the data communication with the second communication partner based on the parameter; and
enabling a TDM transmission of the first communication circuit and the second communication circuit after reception of a go command from the first communication partner.

23. The method of claim 22,
wherein the parameter comprises a receive buffer depth of the first communication partner.

24. The method of claim 22, comprising:
scheduling the data communication with the first communication partner and the second communication partner based on Time Division Multiplex (TDM).

* * * * *